United States Patent
Sharma et al.

(10) Patent No.: US 11,094,346 B2
(45) Date of Patent: Aug. 17, 2021

(54) SYSTEMS AND METHODS FOR ADAPTIVE STREAMING OF MULTIMEDIA CONTENT

(71) Applicant: Netflix, Inc., Los Gatos, CA (US)

(72) Inventors: Sean Sharma, San Jose, CA (US); Guillaume du Pontavice, Palo Alto, CA (US)

(73) Assignee: Netflix, Inc., Los Gatos, CA (US)

( * ) Notice: Subject to any disclaimer, the term of this patent is extended or adjusted under 35 U.S.C. 154(b) by 0 days.

(21) Appl. No.: 16/680,482

(22) Filed: Nov. 11, 2019

(65) Prior Publication Data

US 2020/0152234 A1     May 14, 2020

Related U.S. Application Data

(60) Provisional application No. 62/841,206, filed on Apr. 30, 2019, provisional application No. 62/759,940, (Continued)

(51) Int. Cl.
*H04N 7/173* (2011.01)
*G11B 20/00* (2006.01)
*H04N 21/262* (2011.01)
*H04N 1/32* (2006.01)
(Continued)

(52) U.S. Cl.
CPC ...... *G11B 20/00086* (2013.01); *G06T 1/0021* (2013.01); *H04N 1/32144* (2013.01);
(Continued)

(58) Field of Classification Search
CPC ......... H04N 21/26208; H04N 21/8358; H04N 2201/324; H04N 1/32144; G11B 20/00086; G06T 1/0021
See application file for complete search history.

(56) References Cited

U.S. PATENT DOCUMENTS

| 2009/0185619 A1* | 7/2009 | Taleb | H04N 21/2368 375/240.02 |
| 2010/0088102 A1* | 4/2010 | Urata | G10L 19/167 704/500 |

(Continued)

FOREIGN PATENT DOCUMENTS

| JP | 4275055 B2 | 6/2009 |
| WO | 2013/043918 A1 | 3/2013 |
| WO | 2013/100968 A1 | 7/2013 |

OTHER PUBLICATIONS

International Search Report and Written Opinion received for PCT Application Serial No. PCT/US2019/060963 dated Feb. 20, 2020, 11 pages.

*Primary Examiner* — Kyu Chae
(74) *Attorney, Agent, or Firm* — FisherBroyles, LLP

(57) ABSTRACT

The disclosed computer-implemented method includes determining that audio quality is to be adjusted for a multimedia streaming connection over which audio data and video data are being streamed to a content player. The audio data is streamed at a specified audio quality level and the video data is streamed at a specified video quality level. The method also includes determining that a specified minimum video quality level is to be maintained while adjusting the audio quality level. Still further, the method includes dynamically adjusting the audio quality level of the multimedia streaming connection while maintaining the video quality level of the multimedia streaming connection at at least the specified minimum video quality level. Various other methods, systems, and computer-readable media are also disclosed.

20 Claims, 8 Drawing Sheets

Related U.S. Application Data filed on Nov. 12, 2018, provisional application No. 62/759,943, filed on Nov. 12, 2018.

(51) Int. Cl.
 *G06T 1/00* (2006.01)
 *H04N 21/8358* (2011.01)

(52) U.S. Cl.
 CPC ............... *H04N 21/26208* (2013.01); *H04N 21/8358* (2013.01); *H04N 2201/324* (2013.01)

(56) References Cited

U.S. PATENT DOCUMENTS

| | | | |
|---|---|---|---|
| 2012/0083910 A1* | 4/2012 | Lloyd | G10L 15/20 700/94 |
| 2013/0159498 A1* | 6/2013 | Funge | H04L 43/045 709/224 |
| 2013/0167186 A1* | 6/2013 | Sullivan | H04N 21/43615 725/110 |
| 2015/0235644 A1* | 8/2015 | Son | G10L 21/003 704/500 |
| 2015/0281837 A1* | 10/2015 | Kobayashi | H03G 3/341 381/56 |
| 2016/0255348 A1* | 9/2016 | Panchagnula | H04N 19/146 375/240.02 |
| 2017/0109128 A1 | 4/2017 | Parvizi et al. | |
| 2017/0287433 A1 | 10/2017 | Majid | |
| 2019/0147734 A1* | 5/2019 | Kumar Murugesan | G06F 3/14 348/159 |
| 2019/0182512 A1* | 6/2019 | Bhooi | H04N 21/2402 |
| 2020/0162392 A1* | 5/2020 | Mani | H04L 65/1083 |

* cited by examiner

SYSTEMS AND METHODS FOR ADAPTIVE STREAMING OF MULTIMEDIA CONTENT

CROSS REFERENCE TO RELATED APPLICATION

This application claims the benefit of U.S. Provisional Application No. 62/759,940, filed Nov. 12, 2018, U.S. Provisional Application No. 62/759,943, filed Nov. 12, 2018, and U.S. Provisional Application No. 62/841,206, filed Apr. 30, 2019, the disclosures of each of which are incorporated, in their entirety, by this reference.

BACKGROUND

Digital content distribution systems may provide a variety of different types of content (e.g., tv shows, movies, etc.) to end users. This content may include both audio and video data and may be sent to a user's content player as a multimedia stream. The quality of video content within a multimedia stream may be dependent on, among other things, a content player's network connection with a content distribution system. For instance, if a user streams a movie over a network connection with a content provider, that movie may be streamed at a rate dictated primarily by the bandwidth currently available on the network connection. Throughout the stream, the content provider may vary the encoding quality of the video data based on the available bandwidth. In contrast, audio data in the stream is typically provided at a single, fixed bit rate.

SUMMARY

As will be described in greater detail below, the present disclosure describes methods and systems for dynamically adjusting audio quality level in a multimedia streaming connection.

In one example, a computer-implemented method for adaptively streaming multimedia content includes determining that audio quality is to be adjusted for a multimedia streaming connection over which audio data and video data are being streamed to a content player, where the audio data is streamed at a specified audio quality level and the video data is streamed at a specified video quality level. The method further includes determining that a specified minimum video quality level is to be maintained while adjusting the audio quality level, and dynamically adjusting the audio quality level of the multimedia streaming connection while maintaining the video quality level of the multimedia streaming connection at at least the specified minimum video quality level.

In one example, dynamically adjusting the audio quality level comprises increasing the audio quality level. In some cases, the audio quality level is automatically increased to subsequent higher quality levels until the video quality level reaches a specified quality level that is higher quality than the specified minimum video quality level. In some examples, the audio quality level is adjusted according to a specified bitrate ladder. In some examples, the audio quality level is dynamically adjusted according to one or more user preferences, the user preferences indicating whether audio or video is to be prioritized in the multimedia streaming connection.

In some examples, the method further includes determining that the content player is operating on a specified electronic device, identifying various audio or video hardware capabilities of the specified electronic device, and dynamically adjusting the audio quality level of the multimedia streaming connection according to the audio or video capabilities of the specified electronic device. In some examples, the audio quality level is dynamically adjusted for multiple different types of electronic devices. In some examples, the audio data rate at which the audio data is transmitted over the multimedia streaming connection is varied based on a cache size associated with the specified electronic device.

In some examples, dynamically adjusting the audio quality level involves decreasing the audio quality level. In some cases, the audio quality level is dynamically decreased upon determining that network bandwidth for the multimedia streaming connection has dropped below a specified amount. In some examples, the video data corresponds to a movie or television show and, in such cases, the audio quality level is dynamically decreased upon determining that an audio track associated with the movie or television show is substantially silent for at least a minimum specified period of time.

In some examples, the video quality level is prioritized over the audio quality level in the multimedia streaming connection. As such, the audio quality level is dynamically reduced to maintain a specified minimum video quality level. In some examples, the bit rate associated with the audio data in the multimedia streaming connection is varied dynamically based on underlying content associated with the audio data.

In some examples, the method further includes, prior to streaming data through the multimedia streaming connection, determining a startup delay that would be incurred if a higher audio bitrate were to be used to stream the audio data. In some examples, the audio and video data are streamed to the content player according to margin curves. In some cases, the audio quality level is dynamically adjusted for multiple different audio data streams that are part of the multimedia streaming connection.

In some examples, the method further includes analyzing various portions of prior transmission data associated with audio and video data transferred during the multimedia streaming connection, predicting a future amount of audio and video data that will be transferred using the multimedia streaming connection, and dynamically adjusting the audio quality level based on the predicted future amount of audio and video data that is to be transferred using the multimedia streaming connection. In some examples, the method further includes locking the audio quality level at a specified level for at least a minimum amount of time after the dynamic adjustment.

In addition, a corresponding system for dynamically adjusting a multimedia data stream includes several modules stored in memory, including at least one physical processor and physical memory comprising computer-executable instructions that, when executed by the physical processor, cause the physical processor to: determine that audio quality is to be adjusted for a multimedia streaming connection over which audio data and video data are being streamed to a content player, where the audio data is streamed at a specified audio quality level and the video data is streamed at a specified video quality level, determine that a specified minimum video quality level is to be maintained while adjusting the audio quality level, and dynamically adjust the audio quality level of the multimedia streaming connection while maintaining the video quality level of the multimedia streaming connection at at least the specified minimum video quality level.

In some examples, the above-described method is encoded as computer-readable instructions on a computer-readable medium. For example, a computer-readable medium includes one or more computer-executable instructions that, when executed by at least one processor of a computing device, cause the computing device to determine that audio quality is to be adjusted for a multimedia streaming connection over which audio data and video data are being streamed to a content player, where the audio data is streamed at a specified audio quality level and the video data is streamed at a specified video quality level, determine that a specified minimum video quality level is to be maintained while adjusting the audio quality level, and dynamically adjust the audio quality level of the multimedia streaming connection while maintaining the video quality level of the multimedia streaming connection at at least the specified minimum video quality level.

Features from any of the embodiments described herein are usable in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
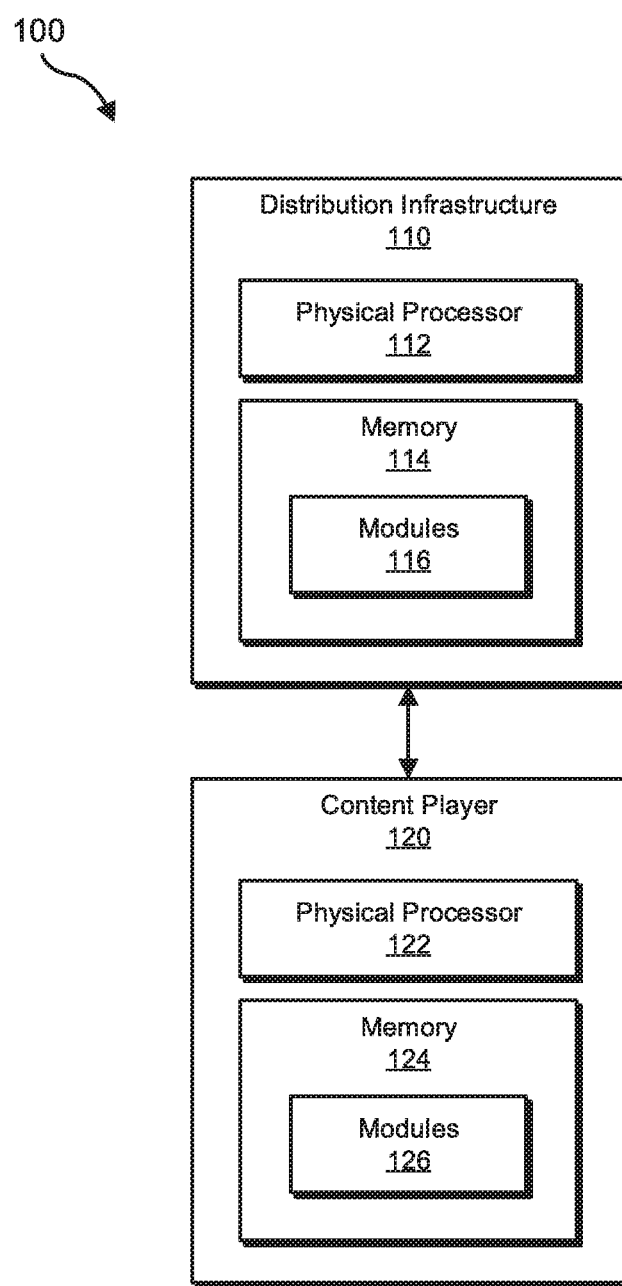
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As will be explained in greater detail below, the systems and methods described herein are generally directed to dynamically adjusting bit rates of multimedia content streams, such as audio-video streams. In conventional multimedia streams, audio data is encoded and streamed at a fixed bit rate. Unfortunately, using fixed bit-rate audio within a multimedia stream has various drawbacks. For example, in some cases, a stereo mix is adequate at a particular bit rate (e.g., 192 kilobits per second (kbps)), but a surround mix encoded at the same bit rate may have audible artifacts, reduced soundstage imaging, and/or audible degradation at high frequencies. As another example, fixed bit-rate audio streams do not adapt to changing network conditions and could cause unnecessary audio and/or video rebuffering. These types of audio-related issues have become more common as content providers produce increasingly complex audio mixes with tight levels between dialog, music, and effects elements. In other words, the creative choices of content providers are pushing and exceeding the limits of existing audio encoding and transmission approaches.

One traditional solution to improving audio quality in streaming content is to encode audio at higher fixed bitrates. Unfortunately, while using higher fixed rates for streaming audio addresses some of these drawbacks, in many situations an increase in an audio bit rate actually decreases the quality of a user's overall experience. For example, increasing a Dolby Digital Plus (DD+) stream from 192 kbps to 256 kbps would result in longer start times and undesirable rebuffering for users with limited bandwidth. Furthermore, some electronic devices do not support higher bit rates, and streaming high bit-rate audio to such devices causes audible artifacts and other issues.

In contrast, the systems and methods presented herein address deficiencies in existing systems by dynamically adjusting audio bitrates and/or by balancing bitrates of different types of media in a multimedia stream. For example, some of the methods discussed herein increase audio quality (e.g., increase audio bitrate or change to a higher-quality encoding method) without sacrificing video quality or causing additional rebuffering. For instance, in some cases, audio and video are being streamed from a content provider to a client device. The content provider determines that sufficient bandwidth is available to increase the quality or bit rate of the audio. The content provider then increases the bit rate of the audio level to provide a higher quality audio experience. This higher-quality audio experience, however, does not come at the cost of a lower-quality video experience. When adjusting the bit rate of the audio signal, the content provider maintains a minimum video quality level. Thus, if bandwidth drops for some reason, the audio quality will be reduced to maintain the minimum video quality level. In this manner, the quality level of the audio signal is dynamically adjusted to provide the highest quality audio signal whenever possible. However, if the available bandwidth will not allow both a high-quality audio signal and a minimum quality video signal, the audio signal will be adjusted downward so as not to degrade the video quality.

In some situations, implementing adaptive bit-rate audio streaming improves video quality in a multimedia stream. In some cases, for example, an audio stream is downswitched when network throughput drops, thereby freeing bandwidth for the video stream and reducing video rebuffering or downswitching. In another example, an audio stream is downswitched during a period of silence, dialog, or low-complexity audio to allow a video stream to be upswitched or buffered more effectively. Other embodiments establish new encoding profiles for streaming (e.g., encoding profiles with bit rates higher than 192 kbps for DD+streams). Embodiments of this disclosure also provide methods for certification, blacklisting, and whitelisting certain devices for use with adaptive bit-rate audio.

Adaptive audio streaming also provides intermediary bit rates that are not available in traditional streams. For example, if a user has a strong network connection, an adaptive audio system may increase the audio bit rate to over 600 kbps, which provides an audiophile-quality experience. The ability to effectively stream high-quality audio content is a strong differentiator from existing systems and enables content providers to offer additional tiers of content quality in their subscription plan offerings. The systems and methods described herein also provide a variety of other features and advantages that improve computing devices and content streaming.

Figure 2:
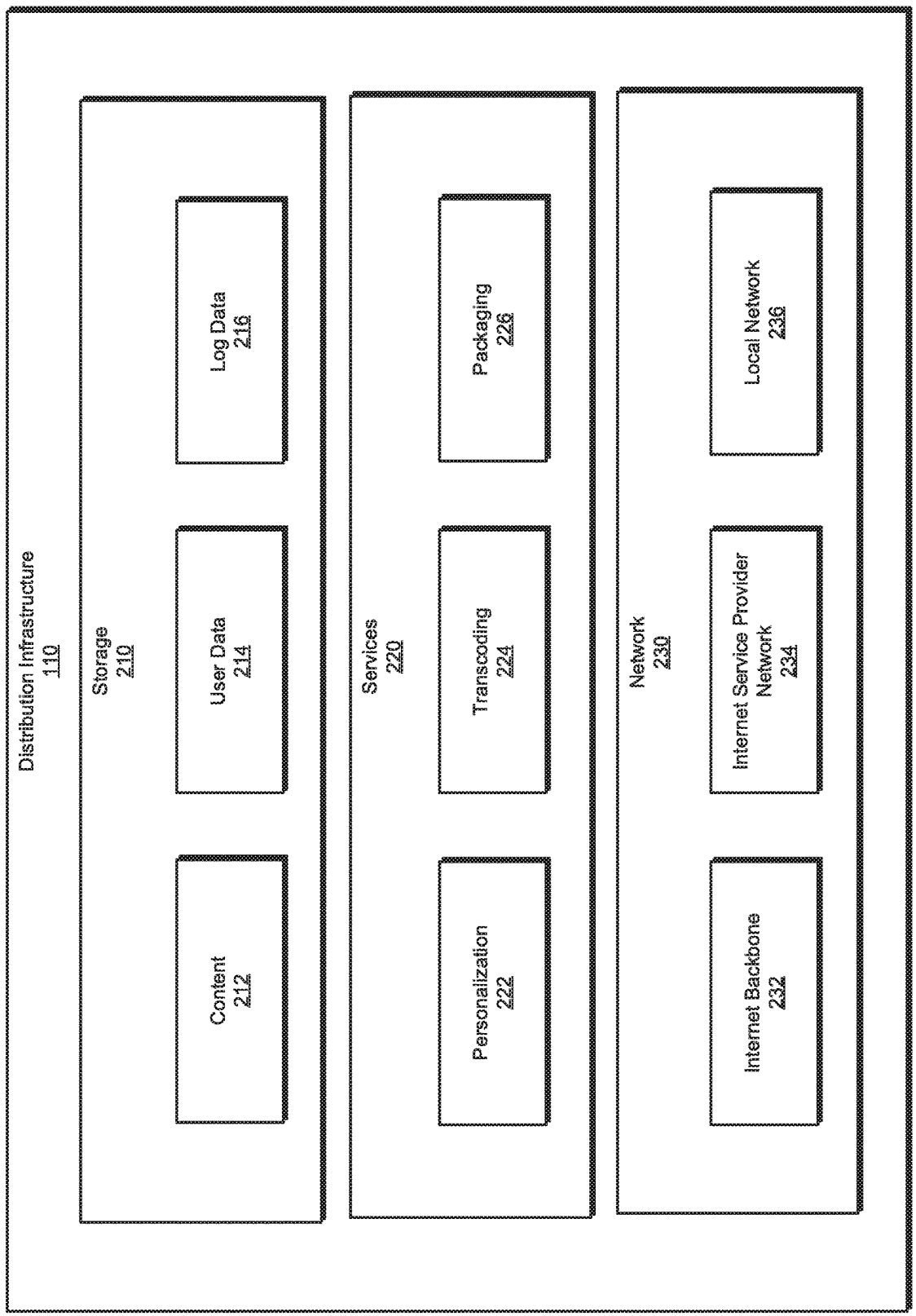
FIG. 2 is a block diagram of an exemplary distribution infrastructure within the content distribution ecosystem shown in FIG. 1.
Figure 3:
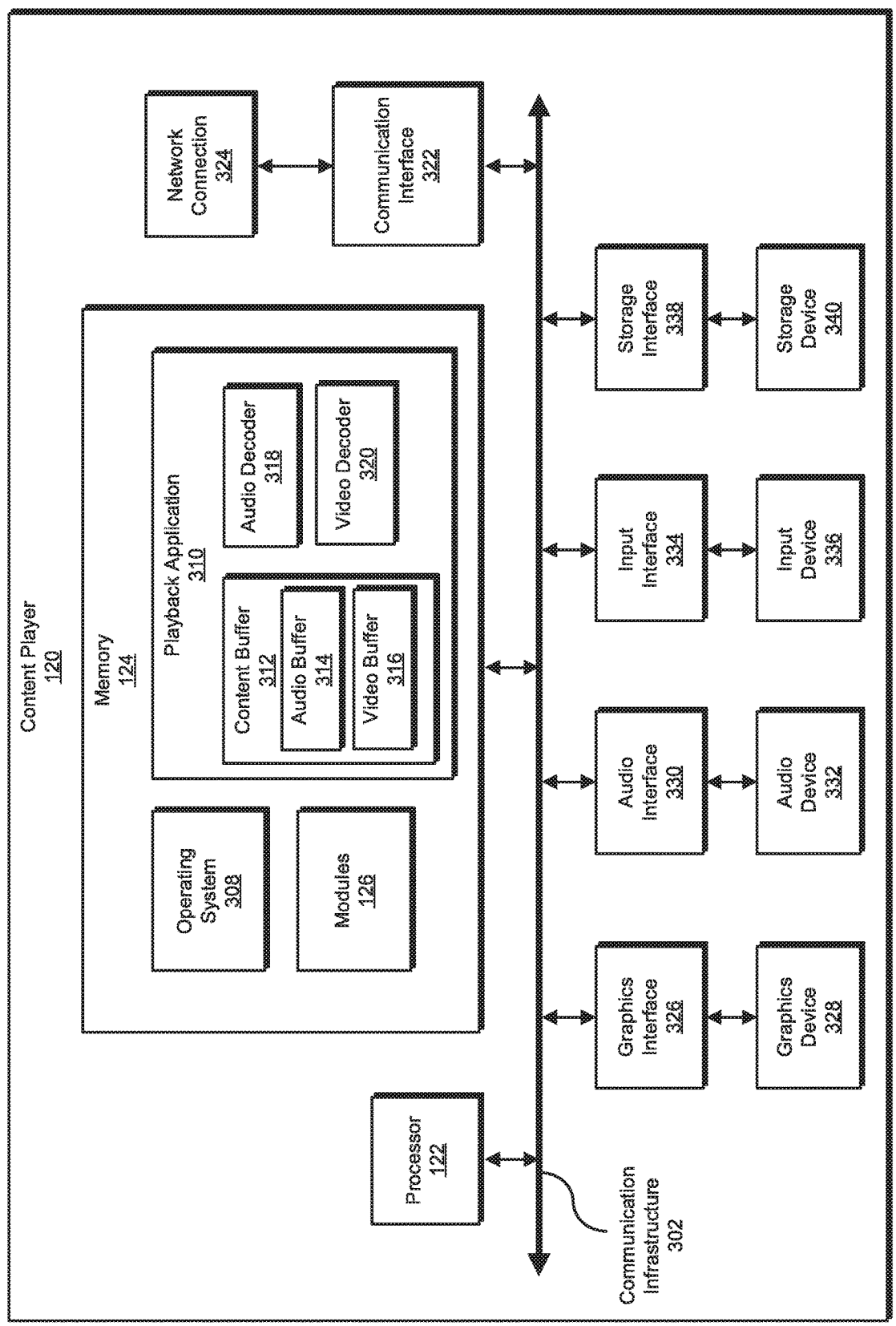
FIG. 3 is a block diagram of an exemplary content player within the content distribution ecosystem shown in FIG. 1.

The following will provide, with reference to FIG. 1, detailed descriptions of exemplary ecosystems for adaptive streaming of multimedia content. The discussion corresponding to FIGS. 2 and 3 presents an overview of an exemplary distribution infrastructure and an exemplary content player, respectively. Detailed descriptions of corresponding computer-implemented methods for adaptive streaming of multimedia content will be provided in connection with FIG. 4.

FIG. 1 is a block diagram of a content distribution ecosystem 100 that includes a distribution infrastructure 110 in communication with a content player 120. In some embodiments, distribution infrastructure 110 is configured to encode data at a specific data rate and to transfer the encoded data to content player 120. Content player 120 is configured to receive the encoded data via distribution infrastructure 110 and to decode the data for playback to a user. The data provided by distribution infrastructure 110 includes, for example, audio, video, text, images, animations, interactive content, haptic data, virtual or augmented reality data, location data, gaming data, or any other type of data that is provided via streaming.

Distribution infrastructure 110 generally represents any services, hardware, software, or other infrastructure components configured to deliver content to end users. For example, distribution infrastructure 110 includes content aggregation systems, media transcoding and packaging services, network components, and/or a variety of other types of hardware and software. In some cases, distribution infrastructure 110 is implemented as a highly complex distribution system, a single media server or device, or anything in between. In some examples, regardless of size or complexity, distribution infrastructure 110 includes at least one physical processor 112 and at least one memory device 114. One or more modules 116 are stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 includes a physical processor 122, memory 124, and one or more modules 126. Some or all of the adaptive streaming processes described herein is performed or enabled by modules 126, and in some examples, modules 116 of distribution infrastructure 110 coordinate with modules 126 of content player 120 to provide adaptive streaming of multimedia content.

In certain embodiments, one or more of modules 116 and/or 126 in FIG. 1 represent one or more software applications or programs that, when executed by a computing device, cause the computing device to perform one or more tasks. For example, and as will be described in greater detail below, one or more of modules 116 and 126 represent modules stored and configured to run on one or more general-purpose computing devices. One or more of modules 116 and 126 in FIG. 1 also represent all or portions of one or more special-purpose computers configured to perform one or more tasks.

In addition, one or more of the modules, processes, algorithms, or steps described herein transform data, physical devices, and/or representations of physical devices from one form to another. For example, one or more of the modules recited herein receive audio data to be encoded, transform the audio data by encoding it, output a result of the encoding for use in an adaptive audio bit-rate system, transmit the result of the transformation to a content player, and render the transformed data to an end user for consumption. Additionally or alternatively, one or more of the modules recited herein transform a processor, volatile memory, non-volatile memory, and/or any other portion of a physical computing device from one form to another by executing on the computing device, storing data on the computing device, and/or otherwise interacting with the computing device.

Physical processors 112 and 122 generally represent any type or form of hardware-implemented processing unit capable of interpreting and/or executing computer-readable instructions. In one example, physical processors 112 and 122 access and/or modify one or more of modules 116 and 126, respectively. Additionally or alternatively, physical processors 112 and 122 execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 stores, loads, and/or maintains one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

FIG. 2 is a block diagram of exemplary components of content distribution infrastructure 110 according to certain embodiments. Distribution infrastructure 110 includes storage 210, services 220, and a network 230. Storage 210 generally represents any device, set of devices, and/or systems capable of storing content for delivery to end users. Storage 210 includes a central repository with devices capable of storing terabytes or petabytes of data and/or includes distributed storage systems (e.g., appliances that mirror or cache content at Internet interconnect locations to provide faster access to the mirrored content within certain regions). Storage 210 is also configured in any other suitable manner.

As shown, storage 210 stores, among other items, content 212, user data 214, and/or log data 216. Content 212 includes television shows, movies, video games, user-generated content, and/or any other suitable type or form of content. User data 214 includes personally identifiable information (PII), payment information, preference settings, language and accessibility settings, and/or any other information associated with a particular user or content player. Log data 216 includes viewing history information, network throughput information, and/or any other metrics associated with a user's connection to or interactions with distribution infrastructure 110.

Services 220 includes personalization services 222, transcoding services 224, and/or packaging services 226. Personalization services 222 personalize recommendations, content streams, and/or other aspects of a user's experience with distribution infrastructure 110. Encoding services 224 compress media at different bitrates which, as described in greater detail below, enable real-time switching between different encodings. Packaging services 226 package encoded video before deploying it to a delivery network, such as network 230, for streaming.

Network 230 generally represents any medium or architecture capable of facilitating communication or data transfer. Network 230 facilitates communication or data transfer using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 includes an Internet backbone 232, an internet service provider 234, and/or a local network 236. As discussed in greater detail below, bandwidth limitations and bottlenecks within one or more of these network segments triggers video and/or audio bit rate adjustments.

FIG. 3 is a block diagram of an exemplary implementation of content player 120 of FIG. 1. Content player 120 generally represents any type or form of computing device capable of reading computer-executable instructions. Content player 120 includes, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 includes a communication infrastructure 302 and a communication interface 322 coupled to a network connection 324. Content player 120 also includes a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 stores and/or loads an operating system 308 for execution by processor 122. In one example, operating system 308 includes and/or represents software that manages computer hardware and software resources and/or provides common services to computer programs and/or applications on content player 120.

Operating system 308 performs various system management functions, such as managing hardware components (e.g., graphics interface 326, audio interface 330, input interface 334, and/or storage interface 338). Operating system 308 also provides process and memory management models for playback application 310. The modules of playback application 310 includes, for example, a content buffer 312, an audio decoder 318, and a video decoder 320.

Playback application 310 is configured to retrieve digital content via communication interface 322 and play the digital content through graphics interface 326. Graphics interface 326 is configured to transmit a rendered video signal to graphics device 328. In normal operation, playback application 310 receives a request from a user to play a specific title or specific content. Playback application 310 then identifies one or more encoded video and audio streams associated with the requested title. After playback application 310 has located the encoded streams associated with the requested title, playback application 310 downloads sequence header indices associated with each encoded stream associated with the requested title from distribution infrastructure 110. A sequence header index associated with encoded content includes information related to the encoded sequence of data included in the encoded content.

In one embodiment, playback application 310 begins downloading the content associated with the requested title by downloading sequence data encoded to the lowest audio and/or video playback bit rates to minimize startup time for playback. The requested digital content file is then downloaded into content buffer 312, which is configured to serve as a first-in, first-out queue. In one embodiment, each unit of downloaded data includes a unit of video data or a unit of audio data. As units of video data associated with the requested digital content file are downloaded to the content player 120, the units of video data are pushed into the content buffer 312. Similarly, as units of audio data associated with the requested digital content file are downloaded to the content player 120, the units of audio data are pushed into the content buffer 312. In one embodiment, the units of video data are stored in video buffer 316 within content buffer 312 and the units of audio data are stored in audio buffer 314 of content buffer 312.

A video decoder 320 reads units of video data from video buffer 316 and outputs the units of video data in a sequence of video frames corresponding in duration to the fixed span of playback time. Reading a unit of video data from video buffer 316 effectively de-queues the unit of video data from video buffer 316. The sequence of video frames is then rendered by graphics interface 326 and transmitted to graphics device 328 to be displayed to a user.

An audio decoder 318 reads units of audio data from audio buffer 314 and output the units of audio data as a sequence of audio samples, generally synchronized in time with a sequence of decoded video frames. In one embodiment, the sequence of audio samples are transmitted to audio interface 330, which converts the sequence of audio samples into an electrical audio signal. The electrical audio signal is then transmitted to a speaker of audio device 332, which, in response, generates an acoustic output.

In situations where the bandwidth of distribution infrastructure 110 is limited and/or variable, playback application 310 downloads and buffers consecutive portions of video data and/or audio data from video encodings with different bit rates based on a variety of factors (e.g., scene complexity, audio complexity, network bandwidth, device capabilities, etc.). In some embodiments, video playback quality is prioritized over audio playback quality. Audio playback and video playback quality are also balanced with each other, and in some embodiments audio playback quality is prioritized over video playback quality.

Graphics interface 326 is configured to generate frames of video data and transmit the frames of video data to graphics device 328. In one embodiment, graphics interface 326 is included as part of an integrated circuit, along with processor 122. Alternatively, graphics interface 326 is configured as a hardware accelerator that is distinct from (i.e., is not integrated within) a chipset that includes processor 122.

Graphics interface 326 generally represents any type or form of device configured to forward images for display on graphics device 328. For example, graphics device 328 is fabricated using liquid crystal display (LCD) technology, cathode-ray technology, and light-emitting diode (LED) display technology (either organic or inorganic). In some embodiments, graphics device 328 also includes a virtual reality display and/or an augmented reality display. Graphics device 328 includes any technically feasible means for generating an image for display. In other words, graphics device 328 generally represents any type or form of device capable of visually displaying information forwarded by graphics interface 326.

As illustrated in FIG. 3, content player 120 also includes at least one input device 336 coupled to communication infrastructure 302 via input interface 334. Input device 336 generally represents any type or form of computing device capable of providing input, either computer or human generated, to content player 120. Examples of input device 336 include, without limitation, a keyboard, a pointing device, a speech recognition device, a touch screen, a wearable device (e.g., a glove, a watch, etc.), a controller, variations or combinations of one or more of the same, and/or any other type or form of electronic input mechanism.

Content player 120 also includes a storage device 340 coupled to communication infrastructure 302 via a storage interface 338. Storage device 340 generally represents any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems are included in or connected to content player 120. Conversely, one or more of the components and devices illustrated in FIG. 3 need not be present to practice the embodiments described and/or illustrated herein. The devices and subsystems referenced above are also interconnected in different ways from that shown in FIG. 3. Content player 120 is also employed in any number of software, firmware, and/or hardware configurations. For example, one or more of the example embodiments disclosed herein are encoded as a computer program (also referred to as computer software, software applications, computer-readable instructions, or computer control logic) on a computer-readable medium. The term "computer-readable medium," as used herein, refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, etc.), optical-storage media (e.g., Compact Disks (CDs), Digital Video Disks (DVDs), and BLU-RAY disks), electronic-storage media (e.g., solid-state drives and flash media), and other digital storage systems.

A computer-readable medium containing a computer program is loaded into content player 120. All or a portion of the computer program stored on the computer-readable medium is then stored in memory 124 and/or storage device 340. When executed by processor 122, a computer program loaded into memory 124 causes processor 122 to perform and/or be a means for performing the functions of one or more of the example embodiments described and/or illustrated herein. Additionally or alternatively, one or more of the example embodiments described and/or illustrated herein are implemented in firmware and/or hardware. For example, content player 120 is configured as an Application Specific Integrated Circuit (ASIC) adapted to implement one or more of the example embodiments disclosed herein.

Figure 4:
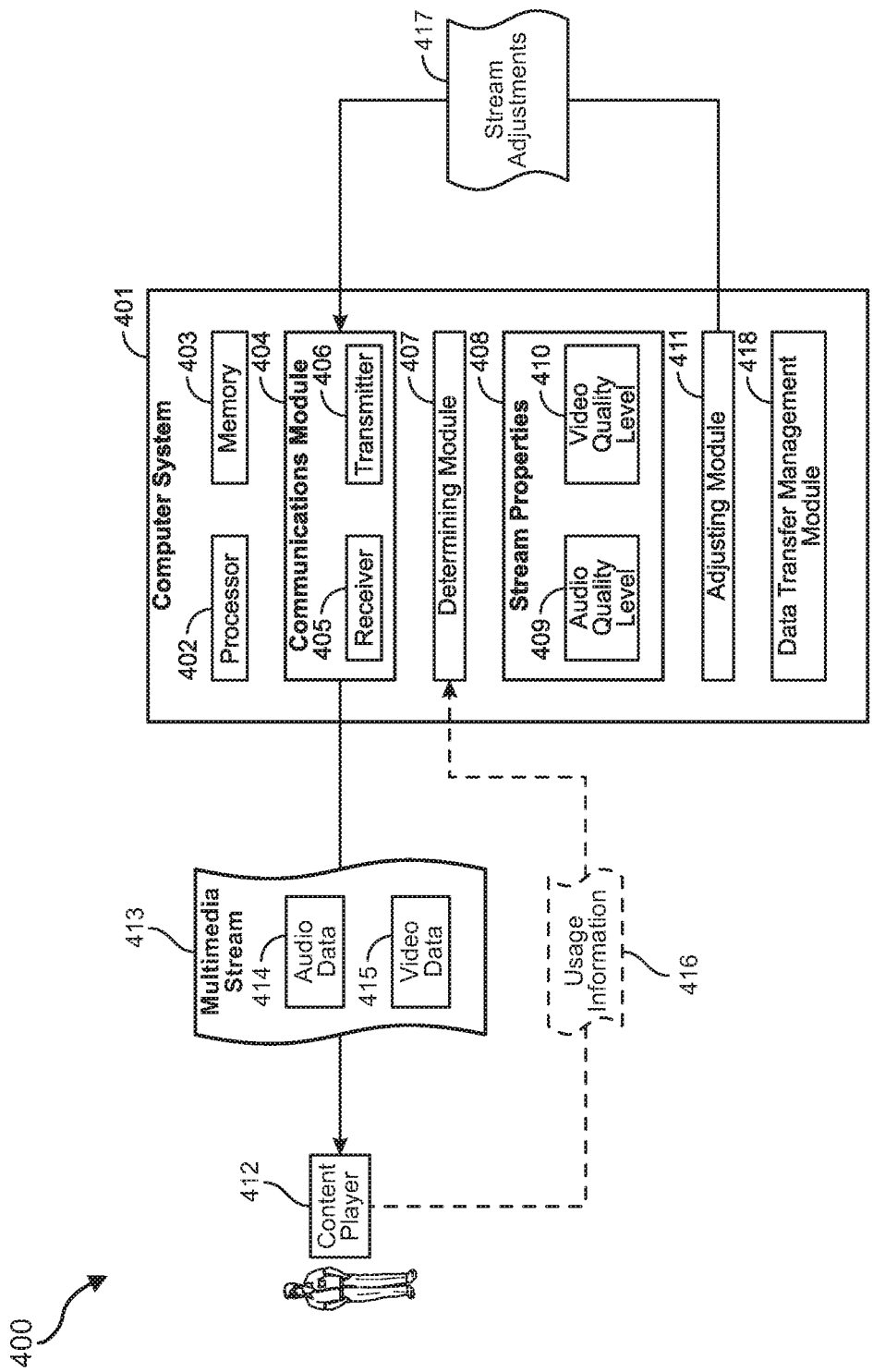
FIG. 4 illustrates a computing environment in which audio data is dynamically adjusted over a multimedia streaming connection.

FIG. 4 illustrates a computing environment 400 that includes a computer system 401. The computer system 401 is substantially any type of computing system including a local computing system or a distributed (e.g., cloud) computing system. The computer system 401 includes at least one processor 402 and at least some system memory 403. The computer system 401 includes program modules for performing a variety of different functions. The program modules are hardware-based, software-based, or include a combination of hardware and software. Each program module uses computing hardware and/or software to perform specified functions, including those described herein below.

The computer system 401 also includes a communications module 404 that is configured to communicate with other computer systems. The communications module 404 includes any wired or wireless communication means that can receive and/or transmit data to or from other computer systems. These communication means include hardware interfaces including Ethernet adapters, WIFI adapters, hardware radios including, for example, a hardware-based receiver 405, a hardware-based transmitter 406, or a combined hardware-based transceiver capable of both receiving and transmitting data. The radios are cellular radios, Bluetooth radios, global positioning system (GPS) radios, or other types of radios. The communications module 404 is configured to interact with databases, mobile computing devices (such as mobile phones or tablets), embedded or other types of computing systems.

The computer system 401 also includes a determining module 407. The determining module 407 is configured to determine when to adjust audio video quality in a multimedia stream. The determining module 407 is also configured to determine the amount by which to adjust the audio quality. For example, in FIG. 4, the determining module 407 monitors the multimedia stream 413 that is being streamed to the content player 412. The multimedia stream 413 includes any type of audio data 414, video data 415, text, pictures, or other types of multimedia content. In some cases, the determining module 407 determines that audio quality is to be adjusted, either upward or downward. Adjusting the audio quality level 409 includes increasing or decreasing an audio bitrate, changing an audio encoding scheme, changing from two-channel to 5.1 channel or to 7.1 channel or to some other number of channels, or otherwise changing characteristics of the audio data 414. The determining module 407 determines that the audio is to be adjusted based on a variety of factors including current network bandwidth between the computer system 401 and the content player 412, current video quality level 410, capabilities of the content player, or other factors.

Once the determining module 407 has determined that at least one of the stream properties 408 of the multimedia stream 413 is to be changed, the adjusting module 411 changes the stream properties 408 by applying stream adjustments 417. These adjustments 417 change one or more characteristics associated with the audio quality level 409. In some cases, the stream adjustments 417 are applied dynamically during the multimedia stream 413. For example, if the network bandwidth between the computer system 401 and the content player 412 changes (e.g., if the content player is running on a mobile device that is moving in between cells), the determining module 407 monitors these changes and adjusts the audio quality level 409 and/or the video quality level 410 accordingly.

In some embodiments, the provider of the multimedia stream 413 or the persons viewing the multimedia stream (via the content player 412) indicate that the video quality level 410 is to be prioritized above the audio quality level 409. As such, if the network bandwidth drops between the computer system 401 and the content player 412, the video data 415 in the multimedia stream 413 will be maintained at a higher level than the audio data 414. Over time, the network bandwidth typically fluctuates up and down, allowing more or less data to be transferred. As the network bandwidth fluctuates, the audio quality level 409 will also fluctuate but will be held below a specific level. This level is determined, by the determining module 407, to be a point at which maintaining a certain audio quality level 409 would interfere with maintaining a certain video quality level 410. Thus, for instance, if the video quality level 410 were to be maintained at a minimum level of 3 Mbps, and if maintaining an audio quality level of 768 Kbps would bring the video quality level 410 below 3 Mbps, then the audio quality level would be dropped to maintain the minimum video quality level. These and other concepts will be explained in greater detail below with regard to method 500 of FIG. 5 and with regard to FIGS. 6-11.

Figure 5:
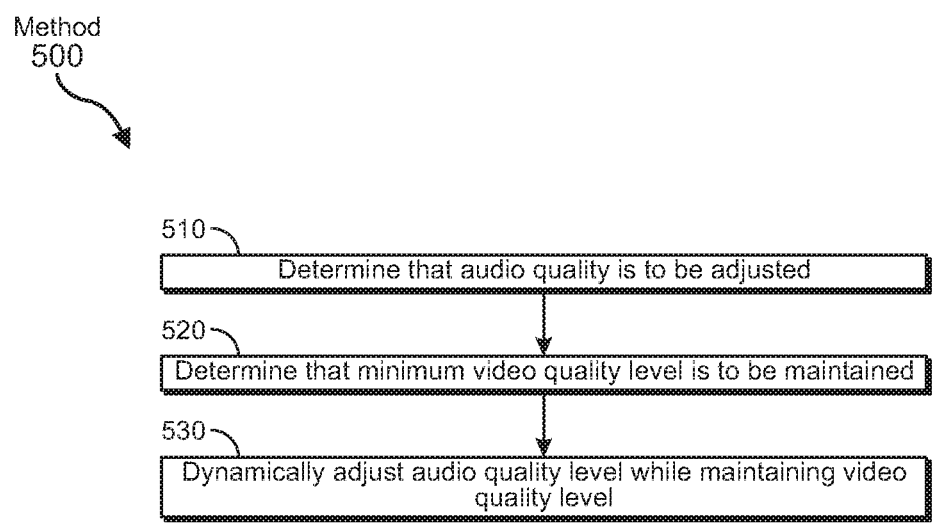
FIG. 5 is a block diagram of an exemplary method for adaptive streaming of multimedia content according to embodiments of this disclosure.

FIG. 5 is a flow diagram of an exemplary computer-implemented method 500 for adaptively streaming multimedia content. The steps shown in FIG. 5 are be performed by any suitable computer-executable code and/or computing system, including the system illustrated in FIG. 4. In one example, each of the steps shown in FIG. 5 represents an algorithm whose structure includes and/or is represented by multiple sub-steps, examples of which will be provided in greater detail below.

As illustrated in FIG. 5, at step 510, one or more of the systems described herein determines that audio quality is to be adjusted for a multimedia streaming connection over which audio data and video data are being streamed to a content player. For example, in some cases, the determining module 407 determines that the audio quality level 409 is to be adjusted for multimedia stream 413. The multimedia stream 413 is streamed from a provider (e.g., computer system 401) to a content player 412. As noted above, the content player 412 is a software program that is instantiated on any of a number of different types of electronic devices. Within the multimedia stream 413, the audio data 414 is streamed at a specified audio quality level 409 and the video data 415 is streamed at a specified video quality level 410. The quality level of the audio or video data determines the fidelity at which the underlying multimedia content is reproduced by the content player. If a high-quality audio stream is provided, the content player 412 will play the audio at a higher bitrate or in a higher-quality encoding. Similarly, if a lower-quality audio stream is provided, the content player 412 will play the audio at a lower bitrate or in a lower-bitrate encoding.

Method 500 of FIG. 5 further includes determining, at step 520, that a specified minimum video quality level is to be maintained while adjusting the audio quality level. Traditional content players and content streaming systems do not set a minimum level for video and then adjust the audio quality within those confines. Thus, in contrast to traditional systems that simply downgrade or upgrade video based on available bandwidth, the embodiments described herein determine that specified minimum video quality level 410 is to be maintained while adjusting the audio quality level 409. Accordingly, a minimum video quality level 410 is established and the audio quality level 409 is adjusted upward as bandwidth is available, but not beyond the point where the higher quality audio would take sufficient bandwidth away from the video data as to pull the video quality level 410 below the specified minimum level. Method 500 of FIG. 5 also includes, at step 530, dynamically adjusting the audio quality level of the multimedia streaming connection while maintaining the video quality level of the multimedia streaming connection at at least the specified minimum video quality level. Examples of dynamic audio quality adjustments are shown in FIG. 6.

Figure 6:
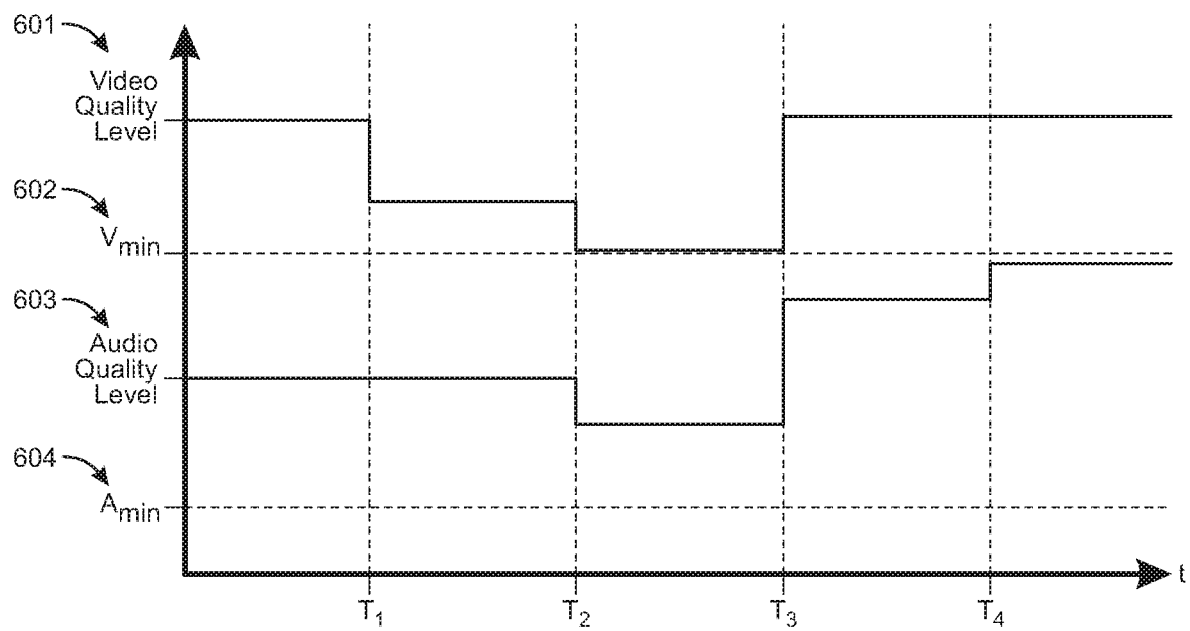
FIG. 6 is a graph in which the audio quality level of a multimedia stream is adjusted in response to changes in video quality level.

FIG. 6 shows a chart 600 with an initial video quality level 601 and an initial audio quality level 603. The chart 600 also shows an established minimum video quality level (Vmin) 602 and established minimum audio quality level (Amin) 604. It will be understood here that the actual, real-life quality levels are changeable and could be different in each situation. For instance, in some cases, the video quality level 601 is different for a television than it is for a cell phone. Similarly, the audio quality level is different for a streaming set-top box than it is for a laptop or tablet computer system. Thus, the actual numbers used (e.g., the bitrate or encoding rate) are less important than the ratios between audio quality level and video quality level.

For example, at time T1 in FIG. 6, the video quality level 601 transitions from an initial value to a lower value (perhaps due to network interference, for example). Because the video quality level 601 has not reached the minimum video quality level (Vmin), the audio quality level 603 is not reduced. Also, in some cases, the audio level is increased at this point since the video quality level 601 is not at Vmin.

At time T2, however, the network experiences another degradation in quality and the video quality level 601 drops to Vmin 602. At this point, the adjusting module (e.g., 411 of FIG. 1) dynamically adjusts the audio quality level 603 downward by a specified amount. In some cases, the amount includes a single increment (e.g., from 384 Kbps to 256 Kbps) while in other cases, the amount includes multiple increments (e.g., from 384 Kbps to 128 Kbps). In some embodiments, the determining module 407 of FIG. 4 determines how much additional bandwidth is needed to bring the video quality level 601 up to or substantially above the minimum level 602. This amount of bandwidth then determines the amount by which the audio quality level is reduced. The additional bandwidth that is now available as a result of dropping the audio quality level is used to provide an increased video quality level.

At time T3 in chart 600, the network bandwidth has improved and the video quality level 601 increases to the initial value, well above Vmin. Accordingly, the adjusting module 411 of FIG. 4 dynamically adjusts the audio quality level 603 upwards to a near maximum level (e.g., 512 Kbps). At time T4, because the video quality level is holding steady, the adjusting module 411 again dynamically increases the audio quality level 603. Thus, as can be seen, over time, the audio quality level 603 is continually adjusted to provide the highest possible audio quality level for the content player 412. If bandwidth drops and video quality begins to degrade, the audio quality is dropped to the point that video quality is maintained at at least Vmin. In this manner, the embodiments herein provide the highest quality audio possible without degrading the video quality beyond a specified point.

In other embodiments, the determination to increase or decrease the audio quality level 603 is based solely on available bandwidth. The system continually determines how much bandwidth is available for audio and/or video and adjusts the audio quality level accordingly. Thus, at time T2, for example, the system may determine that available bandwidth has dropped, or that the audio buffer has dropped below a specified amount of buffered data. The system may then later determine, at time T3 and again at time T4, that the available bandwidth has increased. As such, the system increases the audio quality level to a higher quality level at T3 and to the highest quality level at T4.

As noted above, a content player includes a general-purpose processor (e.g., a central processing unit (CPU)) or special-purpose processor (e.g., an ASIC or FPGA) that is configured to decode an audio or video data stream. These processors receive the audio and video data from a network adapter and process the data to generate audio and/or video signals that are then sent to speakers and/or a display, respectively. Across different playback devices, however, these general-purpose and special-purpose processors have varying abilities to decode the audio and video data. More specifically, some processors are better than others at handling certain types of encoding or handling certain data rates. Indeed, each of potentially thousands of different types of phones, tablets, televisions, audio receivers, surround sound systems, wearable devices, and other playback devices have slightly or significantly different capabilities and limitations. Some of these devices are not capable of dealing with changes to audio bit rates or do not support certain audio encodings.

Figure 7:
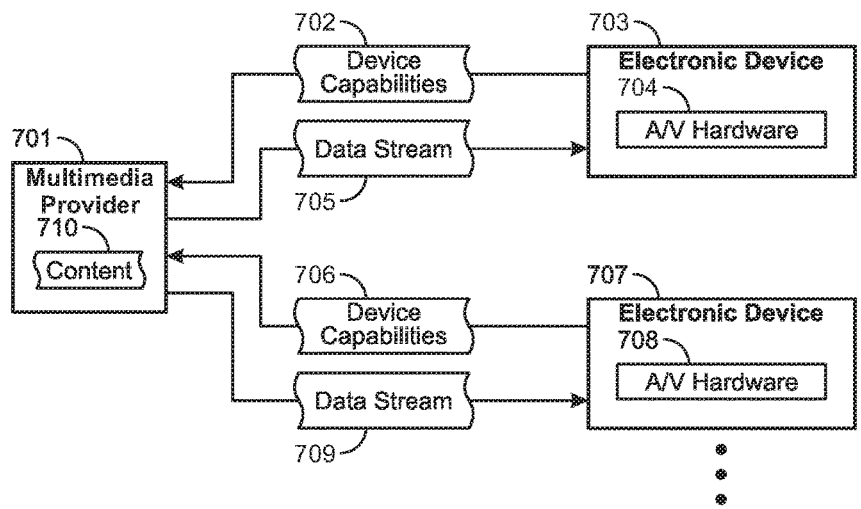
FIG. 7 illustrates a computing environment in which different data streams are sent to different electronic devices based on device capabilities.

For example, as shown in FIG. 7, a multimedia provider 701 provides multimedia content 710 to different electronic devices 703 and 707. Each of the electronic devices 703 and 707 has different A/V hardware (704 and 708, respectively).

Each electronic device 703/707 reports its device capabilities 702/706 to the multimedia provider 701. The multimedia provider then creates customized data streams 705/709 that are specific to the capabilities of each device. Thus, in one embodiment for example, the determining module 407 of FIG. 4 determines that a content player (e.g., 412) is operating on a specified electronic device. The determining module 407 then identifies audio and/or video hardware capabilities of the specified electronic device (e.g., based on self-reported or queried device capability data 702/706), and the adjusting module 411 and dynamically adjusts the audio quality level of the multimedia streaming connection according to the audio or video capabilities of the specified electronic device. Thus, if the electronic device can only handle low definition video, low-definition video will be transmitted in the data stream. On the other hand, if the electronic device can handle high-definition video, the multimedia provider 701 will provide high-definition video.

Figure 8:
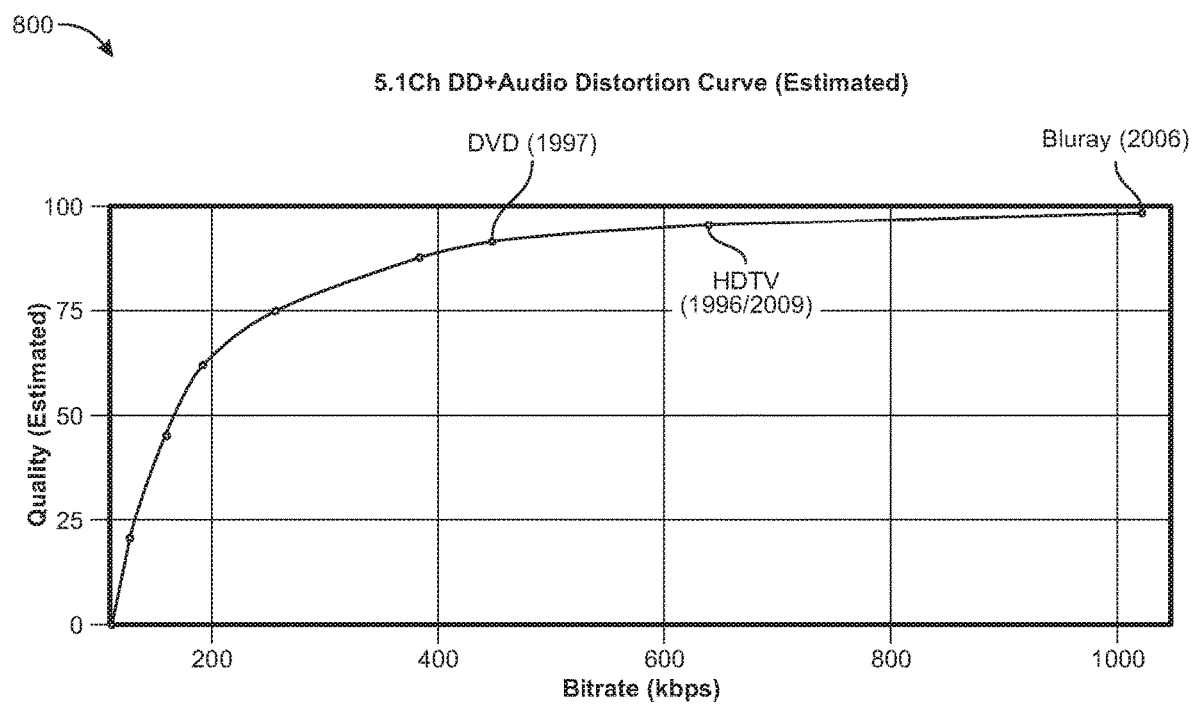
FIG. 8 is a graph of an exemplary distortion curves for various audio encoding technologies.

FIG. 8 shows graph 800 with a distortion curve that represents estimated perceived audio quality at certain bitrates for Dolby Digital Plus (DD+) 5.1. These types of distortion curves are used to identify bitrate switching thresholds. Alternatively, these distortion curves are used to identify encoding technologies to use at certain bitrates, and/or as a consideration in one or more other aspects of designing or implementing an adaptive bitrate audio system.

The adaptive bitrate audio systems described herein use various algorithms and procedures to determine when to upswitch to a higher bitrate or when to downswitch to a lower bitrate. For example, as noted in FIG. 7, when an electronic device (e.g., 703) connects to a multimedia provider (e.g., 701), the device presents its audio capabilities to the multimedia provider. The provider determines, based on the device capabilities, throughput history detected during prior connection to the device, and/or any other suitable factor, which audio stream it will signal and provide to the electronic device.

In one example, if throughput history is available for an electronic device, for the initial audio stream the server selects a bitrate less that is less than a particular percentage (e.g., 15%) of throughput history. In this example, if the throughput history indicates a prior average bitrate of 1 Mbps, the server selects a bitrate around or less than 150 kbps. Similarly, if the throughput history indicates 5 Mbps, the server selects a bitrate around or less than 750 kbps. In some embodiments, the server rounds down to the closest bitrate that is available on the server and that is compatible with the device. In the example with 1 Mbps throughput history, the server selects a bitrate of 96 kbps, and in the example with the throughput history of 5 Mbps, the server selects a bitrate of 640 kbps.

In some cases, a multimedia provider or distribution server uses factors other than throughput history to identify a bitrate for an initial stream. For example, if throughput history isn't available for a device, the server then selects the lowest available bitrate stream compatible with that device. In another example, a device indicates a preferred stream (e.g., via device settings, user preferences, etc.) to the server, and the server selects an audio stream based on this preference.

Figure 9:
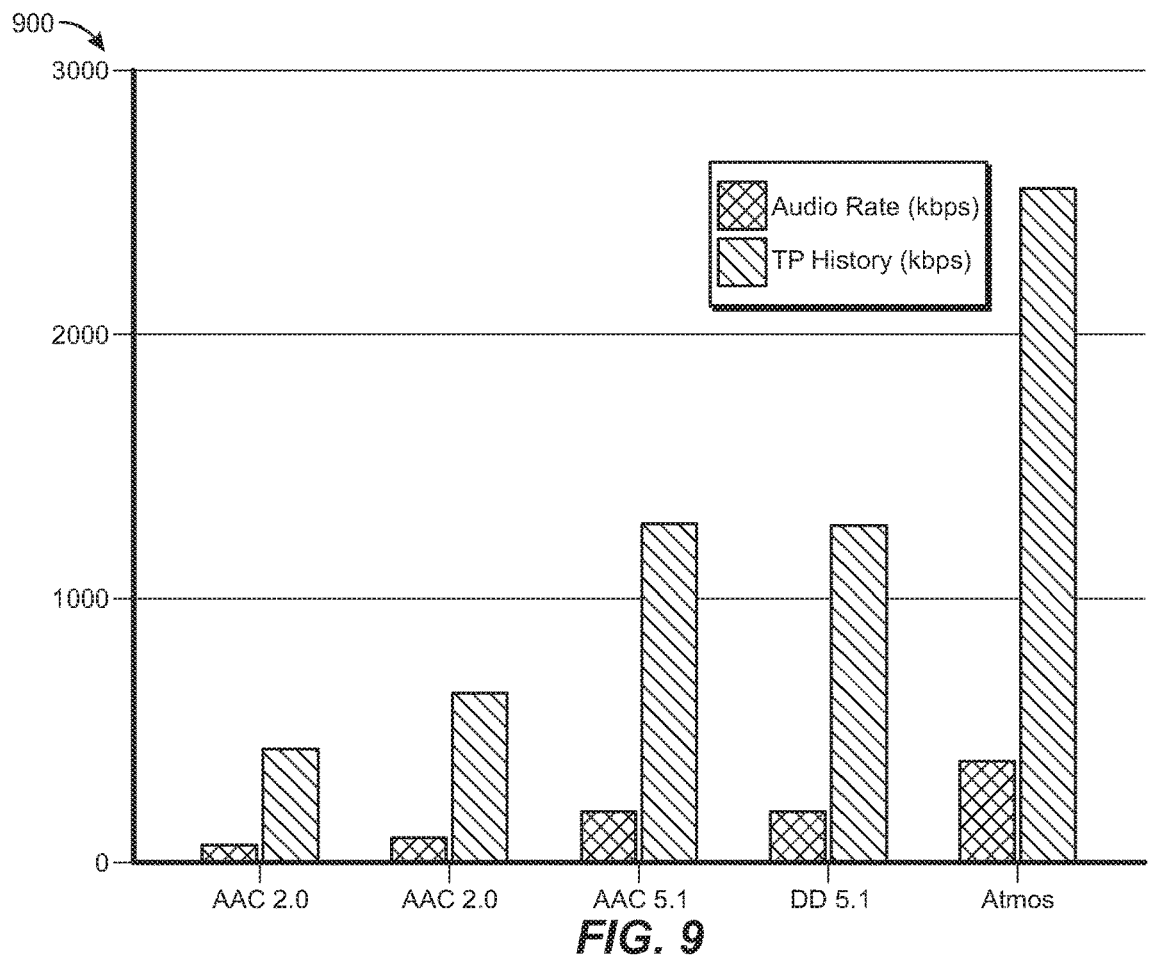
FIG. 9 is a graph of an exemplary adaptive audio scheme showing encoding technologies and bitrates that are selected for certain throughput history rates.

FIG. 9 shows an example of audio bitrates and encodings that are used for particular throughput history ranges. In the graph 900, a throughput history of around 427 kbps to 640 kbps triggers a 64 kbps encoding (e.g., using AAC), a throughput history of around 640 kbps to 1280 kbps triggers a 96 kbps encoding (e.g., using AAC 2.0), a throughput history of around 1280 kbps to 2560 kbps triggers a 192 kbps audio encoding (e.g., using either AAC 5.1 or DD 5.1), and a throughput history of 2560 kbps or higher triggers an audio bitrate of 384 kbps (e.g., using Dolby Atmos). In some embodiments, an audio stream is limited to switching between different bitrates of a particular encoding scheme. In one example, an audio stream is switchable from AAC 2.0 at 96 kbps to AAC 2.0 at 192 kbps but is not switchable from AAC 2.0 at 96 kbps to DD 5.1 or Atmos, regardless of bitrate. Alternatively, an audio stream is switchable between different encoding technologies (e.g., from AAC 2.0 to DD 5.1) if a distribution server and/or a playback device support this type of switching.

Figure 10:
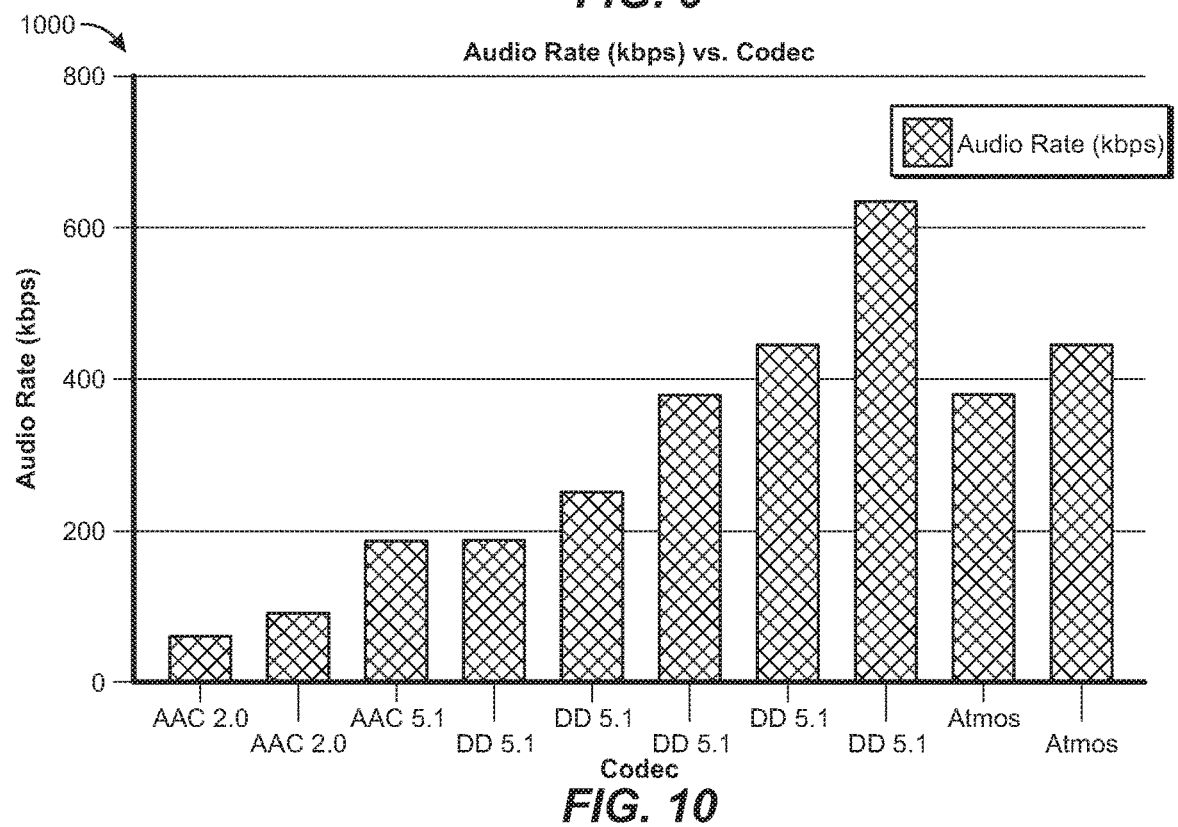
FIG. 10 is a graph of an exemplary adaptive audio scheme showing bitrates that are provided by certain encoding schemes.

FIG. 10 illustrates a graphical representation 1000 of another adaptive audio bitrate scheme. As shown in FIG. 10, AAC 2.0 is switchable between 64 kbps and 96 kbps, AAC 5.1 has a single bitrate at 192 kbps, DD 5.1 is switchable between five bitrates (e.g., 192 kbps, 256 kbps, 384 kbps, 448 kbps, and 640 kbps), and Atmos is switchable between 384 kbps and 448 kbps. In other examples, certain high bitrate encoding technologies (e.g., Atmos) are not switchable between different bitrates while other lower-bitrate encoding technologies (e.g., DD 5.1, AAC 5.1, AAC 2.0, etc.) are switchable.

Distribution systems switch between different bitrates in a variety of ways. In one example, a distribution system only upswitches a stream one step at a time (e.g., a content server upswitches from DD 5.1 192 kbps to 256 kbps but does not skip a step by switching from 192 kbps to 384 kbps). In some situations, single step upswitching helps avoid rebuffering by not switching to a bitrate that cannot be handled or maintained by the device. While single-step upswitching is advantageous in certain scenarios, a distribution system also skips one or more steps when upswitching.

Distribution systems consider various factors when deciding whether to upswitch an audio stream. In some examples, a distribution system only upswitches if predicted or detected audio throughput is greater than or equal to a threshold associated with the next audio bitrate in an upswitch ladder. A distribution system also considers the size of the audio buffer and/or any other suitable factor when determining whether to upswitch an audio stream. In some cases, for example, a distribution server require that a playback device have an audio buffer of at least a particular size for that device to be allowed to upswitch to a particular bitrate.

Like the upswitching scenarios where audio stream quality is upswitched to a higher quality, downswitching is triggered a single step at a time or multiple steps at a time. In at least one example, a distribution server only allows for single-step upswitching while providing multi-step downswitching. The opposite is also possible, where the distribution server only allows for single-step downswitching while providing multi-step upswitching. In some cases, downswitching is triggered by the prediction or detection of audio throughput being lower than a throughput associated with a current bitrate. In one example, a distribution server prevents a stream that has been upswitched or downswitched from being changed again for a predetermined period of time (e.g., a period of time associated with a buffer size of a playback device).

In some cases, a distribution server uses upswitch and/or downswitch factors in determining whether to change the bitrate of an audio stream. The upswitch and downswitch factors may be the same or different. For example, in some cases, the distribution server upswitches an audio stream to the next bitrate if predicted audio throughput is greater than or equal to the product of an upswitch factor and the next audio bitrate. Conversely, in other cases, the distribution server downswitches an audio stream if predicted audio throughput is less than the product of a down-switch factor and the current audio bitrate.

Some systems use an upswitch factor that is higher than a downswitch factor and also set a minimum buffer time required for upswitching and a minimum lock period after downswitching. In one example, a distribution server sets the upswitch factor to 2.0, the downswitch factor to 0.8, the minimum buffer time to 16 seconds, and the post-down-switch lock period to 32 seconds. In this example, if a current audio bitrate is 256 kbps, the playback device would need to have at least 16 s of audio buffered at the current bitrate and at least 2.0*384 kbps (i.e., 768 kbps) of predicted audio throughput before upswitching to 384 kbps. Continuing with this example, the distribution system downswitches from 256 kbps to 196 kbps if predicted audio throughput is less than 0.8*256 kbps (i.e., 204 kbps). In some cases, after downswitching, the distribution system requires the playback device to buffer at least 32 seconds of audio before allowing the playback device to upswitch to a higher bitrate.

Figure 11:
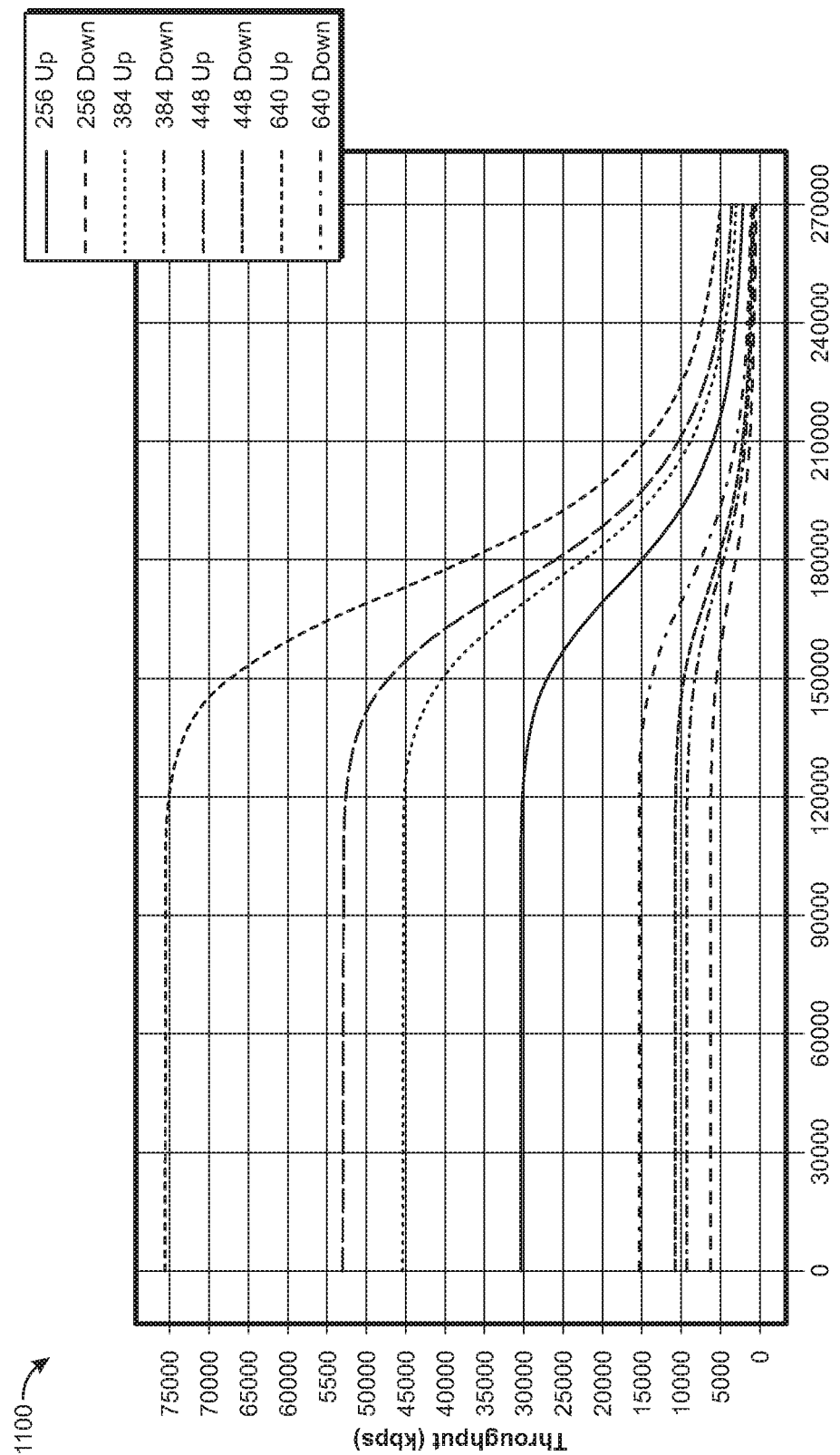
FIG. 11 is a graph of an exemplary switch ladder showing transition curves between bitrates for various audio buffer sizes.

As suggested in the examples above, audio buffer size play a significant role in a device's ability to upswitch to higher bitrates. FIG. 11 illustrates the relationship between buffer size and throughput by depicting an upswitch/downswitch ladder for various audio rates. As shown in chart 1100 of FIG. 11, the larger the buffer size, the less throughput is needed before upswitching to a higher bitrate audio stream. Conversely, the smaller the buffer size, the more throughput is needed before switching to higher quality audio.

In some cases, the data bit rate for the audio stream changes over time and, at least in some cases, changes dramatically. For example, the data bit rate changes when the user is moving in and out of cell phone coverage when in a car. To compensate for such changes in available bandwidth, a distribution system (e.g., 401 of FIG. 4) implements a series of network tests to determine the current available bandwidth between the distribution system and the user's playback device. The distribution system then uses this determination to choose an appropriate bit rate for one or more of the content streams.

As noted above, when multimedia content is streamed in conventional systems, it is typically encoded at a specific bit rate. While some video streaming services provide variable bit-rate video content, audio is typically still provided at a fixed rate. In the embodiments described herein, however, the distribution system provides an audio stream and/or other media streams at a variable rate that increases at certain times and decreases at other times in response to available bandwidth or other factors.

When varying the bit rate for an audio stream, the distribution system takes into consideration the video bit rate. At least in some embodiments, providing high-quality video is the top priority, and providing high-quality audio is a secondary consideration. In such cases, the distribution system provides a video signal that is optimal for the network conditions and then uses any remaining bandwidth to transmit an audio signal that is as high quality as possible.

For instance, when distribution systems deliver content to playback devices, the distribution systems determine how much bandwidth is currently available and further determine the playback device's ability to handle changes in bit rate. The embodiments described herein provide an optimal audiovisual experience for end users and, as such, prioritize transmission of video content while adjusting audio content within the available bandwidth. As noted above, if a given connection has a particular amount of available bandwidth, the majority of that bandwidth is taken by video data and a small portion is left over for audio data. In some cases, the systems described herein incrementally increase audio quality without impacting the quality of the video signal (as described in conjunction with FIG. 6). In such cases, the disclosed systems automatically increase the bit rate for the audio stream, thereby increasing the quality of the audio. If the user's connection slows and the available bandwidth is reduced, the bit rate for the audio stream is dynamically reduced to ensure that video quality is not impacted or is only minimally impacted by the reduced bandwidth.

When making a change in bit rate (either upwards or downwards), the distribution system uses various processes to determine which type of device is consuming the content. In one example, the distribution system obtains information about the capabilities of a content player when the content player first connected to a cloud server of the distribution system. In such cases, the distribution system caches the information about the content player for later use in determining whether to adjust an audio bitrate. In another example, the distribution system, when determining whether to adjust an audio bit rate, sends a query to a device to determine capabilities of the device. In yet another example, a user has an account with the distribution system and the user's device information is stored in association with that user. The device information (e.g., 702) is then used when streaming audio-video content to the playback device. Information about the capabilities of a device includes direct information about a device's capabilities (e.g., bitrates supported by the device, encoding formats supported by the device, etc.) or indirect information that is used to look up a device's capabilities (e.g., the brand of the device, the model number of the device, the operating system used on the device, etc.).

If the user is in a location that has a wired connection or a high capacity wireless connection, the amount by which the bit rate is adjusted is almost solely dependent on the capabilities of the device. For instance, in a hypothetical scenario in which a playback device has a strong network connection, the distribution system would be able to transfer data at substantially any rate and encode the data at any bit rate. The playback device, however in some cases, is a limited-capability phone, such as a feature phone that has reduced functionality relative to other smartphones. Such feature phones have relatively slow central processors and have limited capabilities for decoding audio and video content. As such, even if the network connection allows a higher bit rate, a playback device's hardware constraints still cause the distribution system to limit the audio signal's bit rate. Accordingly, in such cases, the distribution system places limits on certain devices or types of devices, for example, by establishing maximum allowable bit rates for those devices. Over time and after creating audio-video content sessions with many different types of devices, the distribution system thus generates a collection of settings and policies for different devices or types of devices, indicating each platform's capabilities and limitations.

In some cases, content players have a specified cache area (e.g., content buffer 312 of content player 120) that buffers audio and video content separately as the content is streamed. In such devices, a video cache is larger than an audio cache, as video reproduction involves larger data streams. Distribution systems aim to fill these video and audio caches with, for example, between 30 seconds and 2 minutes of buffered content. And, if a data rate is chosen for the audio data that is too high for a given device's audio buffer, that audio buffer will not be able to cache enough audio content to avoid rebuffering.

For example, if the distribution system is streaming audio-video content to a device at 640 kbps, and the device only has a 2 MB audio cache, the cache is only able to hold a few seconds of buffered data. Whereas if the audio data is being streamed at 128 kbps, a 2 MB cache is able to store five times more buffered data. Accordingly, the distribution system also takes into consideration the size of the playback device's audio cache when initially selecting and later adjusting an audio stream's bit rate. Still further, in some cases, each playback device is configured to run certain audio-video playback software applications. Some software applications are more efficient at decoding audio and/or video data and are thus able to process higher bit rates on less powerful hardware. Other software applications are less efficient. Accordingly, the distribution system also considers the playback device's installed software applications when selecting and/or adjusting an audio stream's bit rate.

In this manner, both hardware and software constraints are accounted for when selecting and adjusting an audio stream bit rate. Unlike the above-described scenario, however, where bandwidth is not a concern, in many real-world scenarios bandwidth is a factor, and is often a significant factor, when determining the bit rate for an audio stream. As such, the distribution system notes and considers the relevant device-related constraints, bandwidth-related constraints, and/or other considerations when determining an optimal audio stream bit rate. Once the distribution system has begun providing the multimedia stream, the distribution system determines, according to device and/or bandwidth constraints, the highest available audio stream bit rate for transferring the audio stream. The distribution system then adjusts this bit rate over time to ensure that, even as the bandwidth changes, the bandwidth that is available is properly allocated, prioritizing video while optimizing audio within the remaining capacity.

Thus, the distribution system determines how to allocate bandwidth based not only on the device constraints, but also the continually changing available bandwidth. As the bandwidth changes in the connection between the playback device and the distribution system, the audio signal is upgraded or downgraded dynamically, according to these constraints. In some cases, the bit rate for a given audio stream also depends on the content of the audio. Indeed, some audio content is more complex than other audio content. For instance, in a 5.1 surround sound audio data stream, there are moments when some of the six speakers do not have any signals directed to them. In such cases, the distribution system omits transmitting audio content for those speakers. At other times, all six speakers will have audio content directed to them. Accordingly, the distribution system increases the bit rate of the audio signal for such moments in a song or movie and decreases the bit rate of the audio signal at other times in the song or movie. In some embodiments, these changes to the bit rate based on audio content occur regardless of bandwidth or device constraints or are performed within the established bandwidth and device constraints.

Another factor distribution systems consider for setting audio and/or video bitrates is the complexity of audio or video within a scene. For instance, if a user is watching a video stream that depicts two people talking, some portions of the audio track are be filled with silence. As such, data corresponding to those periods of silence does not need to be transmitted to a content player or only needs to be transmitted at a relatively low bit rate. Accordingly, the distribution system reduces the audio bit rate for those scenes that are less complex. On the other hand, if the user is watching an action scene with an up-tempo score, the audio data is relatively complex. As such, the distribution system increases the variable bit rate based on the complexity of the audio content.

When using video or audio complexity as a factor in determining playback rates, a content player receives a complexity map associated with the content (e.g., video, audio, or both) to be played. The complexity map specifies the complexity level of different scenes or sections of the video and/or audio streams. When selecting the next portion of video data or audio data for download, the content player determines the complexity level of the scene based on the scene complexity map.

Based on the complexity level of the scene and one or more performance factors, the content player then determines the particular video or audio encoding from which to download the portion of the video or audio data. For example, in a scenario where the bandwidth is limited and a scene has low complexity, the content player downloads the portion of video data and/or audio data associated with the scenes from low bit-rate encodings. In this manner, bandwidth is conserved and used to buffer subsequent, and potentially more complex, scenes from higher bit-rate encodings. Other factors that influence the specific encoding from which to download the portion of audio or video data include complexity levels of subsequent scenes, the behavior of the end user consuming the content, the type of output device rendering the content (e.g., high-definition, standard-definition, etc.), and/or the available lead time. These factors combined with the bandwidth limitations of a network connection and/or capabilities of a content player are used to select audio or video encodings from which to download each portion of a media title.

In some cases, the audio content provided by the content source includes metadata indicating which portions of the audio signal are more or less musically complex or involve signals for more or fewer of the surround sound speakers. This metadata indicates timeframes, for example, when a higher bit rate should be used. The metadata states, for example, that a higher bit rate should be used during the data transfer for certain sections of the content. The content server then encodes the audio data at a higher bit rate, constrained by current bandwidth and playback device limitations. As such, the distribution system, knowing which device (or device type) is consuming the content, encodes the audio content based on metadata indications provided with the content. In some examples, the audio encoding is based on currently available bandwidth in the device's connection and/or is based on hardware or software constraints associated with that device.

In this manner, each portion of the audio stream is fully and dynamically customized within any one or more of the above-described constraints. For example, even if the metadata says to increase the audio bit rate (e.g., due to an increase in musical complexity), the distribution system resolves not to (e.g., based on current bandwidth limitations or based on the knowledge that the device's hardware cannot handle the higher bit rate). In another example, the distribution system determines that a relatively small amount of bandwidth is currently available and that the playback device can handle a slightly higher bit rate. In such cases, the distribution system dynamically increases the audio signal bit rate in response to the metadata indication. Other indications or signals trigger a reduction in bit rate at a later point in time.

In some cases, a distribution system considers initial startup time (or "startup delay") when selecting an initial audio stream bit rate. For example, when a user selects a given video or song, the user typically expects the video or song to start as soon as possible. Anything longer than a few seconds greatly detracts from the user's experience or results in the user seeking entertainment elsewhere. Accordingly, the distribution system takes extra precautions to ensure that the audio-video content's initial startup time is as low as possible. In this regard, the distribution system conducts a throughput estimation (prior to or while providing the audio-video content) that indicates the current or expected data throughput to the user's playback device. This throughput estimation is based on historical data and/or an initial amount of data traffic transferred between the distribution system and the playback device. In some cases, the initial communication provides an indication of currently available bandwidth. Additionally or alternatively, the distribution system has established network sessions with the playback device before. The distribution system stores metadata associated with that user's session, and the metadata includes the device's IP address, data transfer rate, device type, operating system, web browser type, playback application used, etc. Any or all of this information is used when choosing an initial data bit rate to use when performing the initial startup.

As noted, the throughput estimation indicates an amount of bandwidth that is currently available between the distribution system and the playback device. In some cases, this throughput estimation is modified or calculated based on previous connection session data. Once the current throughput has been estimated, the distribution system then streams the audio-video data at a rate that is less than the amount indicated in the throughput estimation. This slower bit rate is referred to herein as a discount or margin curve, indicating that a lower bit rate will be used at startup than the maximum bit rate. This discount or margin curve refers to a curve in a graph that illustrates how a lower-than-maximum bit rate is used at startup and, over time, approaches the maximum bit rate for the current conditions (e.g., device capabilities, bandwidth, etc.).

Accordingly, when initially starting an audio-video stream, the distribution system streams the data at a bit rate that is, for example, 75% of the maximum available. Then, over time, the distribution system increments that upwards until the bit rate is at or close to 100% of the maximum available at that moment. In some cases, the margin curve is different for audio data than would be used with video data. For example, because audio buffers have smaller caches, and because video quality is prioritized over audio quality (at least in some cases), video margin curves skew higher such that the initial bit rate for video is at 85-90% of the maximum available bit rate, thereby providing higher quality. In devices that have a larger audio cache, the margin curve also skews higher since more data is buffered. Conversely, in playback devices that have smaller data caches, the margin curve skews smaller, indicating that a bit rate of 60-70% of the maximum bit rate should be used since only a small amount of data is buffered on such devices.

In some cases, the distribution system streams data based on these margin curves or opts to stream data in a different manner. For instance, in some examples, the distribution system disregards or even omits the throughput estimation and simply begins streaming data at a lower rate. This lower data rate is specific to certain devices or specific to certain computer networks and, as such, applies to all devices on that network. The lower data rate is provided for a specified amount of time and then, if sufficient bandwidth is available, the distribution system increases the bit rate of the streamed data. Accordingly, the distribution system has a large amount of control over how the data is initially streamed to the playback device as well as over how the bit rate is changed throughout the extent of the data stream.

In some embodiments, the distribution system packages the audio data stream in a manner that indicates to the playback device when it can switch to data encoded at a different bit rate. For example, in some cases, the hardware and/or software running on the user's playback device is expecting audio data packets encoded at a specific bit rate. An indicator is incorporated within the audio data stream as a hook to notify the playback device when an upswitch or downswitch is permitted to occur. The distribution system uses these indicators to enable seamless switching to higher or lower bit rates for an audio stream. After switching to a new bit rate (either higher or lower than the previous bit rate), each transmitted data block of the new audio stream has more or less data and consumes different amounts of buffer space within the data block. The indicators identify the new bit rate and/or the new amount of data that will be included in each transmitted data block. The playback device then looks for the different data blocks and continues providing the audio stream to the user, switching between streams with different bit rates in a seamless and fluid manner. In some embodiments, a manual implementation is provided in which a user or software routine triggers bit rate changes manually. For example, after a user requests a bit-rate change on a content player, the content player sends a notification to the content provider requesting the new bit rate. The content server then transmits future data blocks encoded with the manually selected bit rate.

Accordingly, whether using a manual selection of bit rates or an automatic selection of bit rates based on available bandwidth and/or other factors, the embodiments described herein provide improved audio quality of experience (QoE) for a user without detracting from the video QoE. In some embodiments, the playback device is streaming multiple audio, video, or other data streams at the same time. In one example, a user is playing a video game and is streaming music in addition to streaming the video and audio content of the game. Or, in another example, the playback device is streaming a movie or video game as well as a video or audio chat session in which users are discussing the movie or video game. Other data streams include haptic content for wearable devices, artificial reality content for augmented reality glasses or virtual reality headsets, and/or various other types of content. In such cases, the distribution system adjusts bit rates of each of these streams in relation to the other data streams to increase the QoE of an end user.

For instance, if a playback device is receiving three data streams, the available receiving bandwidth at that device is divided among the three data streams. In such cases, some content (e.g., audio or video) is prioritized over other content (e.g., haptics data). Furthermore, users provide preferences regarding the various types of content, indicating how and when data stream bit rates are to be adjusted. Accordingly, even in scenarios where multiple different content providers are streaming content to a single playback device, each of these content providers follows policies and user preferences indicating when their data content streams are to be adjusted in line with the network bandwidth that is currently available.

In some embodiments, certain types of devices, or certain brands or models or hardware versions, are whitelisted or blacklisted as devices that are capable or incapable of handling these adjustments to bit rates. Indeed, as mentioned above, some devices lack the processing power, network capabilities, or the cache size to handle changes in bit rate. In some embodiments, content providers (or perhaps third-party services) test certain devices or device families to determine which devices can handle manual or automatic audio stream adjustments. During testing, some devices repeatedly attempt to rebuffer, freeze during playback, or produce audio artifacts that are unappealing and detract from the end-user experience. The distribution system blacklists such devices so that audio stream adjustments do not occur when streaming audio-video content to those devices. Other devices that are tested and shown to be able to handle audio stream adjustments are whitelisted and audio streams to those devices are adjusted according to bandwidth and perhaps other device-related constraints.

In some cases, playback devices are whitelisted or blacklisted based on user feedback or user behavior. For example, if multiple users are viewing a video on a certain type of mobile device such as a phone, and a sufficient number of those users quit viewing the video at or near points at which the audio was automatically adjusted, the distribution system infers that the audio adjustments had a negative effect on the user's experience. Conversely, if multiple users are viewing a video on a certain type of playback device and a sufficiently high number of those users watch the video past the points at which the audio was automatically adjusted, the distribution system infers that the audio adjustments did not have an adverse effect on the user's video watching experience. Still further, in some cases, the user provides explicit feedback in the form of an email or a survey or an app rating, indicating that the audio sounded grainy and muffled, or sounded detailed and accurate. The distribution system uses such feedback as a factor when determining whether to blacklist or whitelist a given device.

When switching to audio streams with higher or lower bit rates, substantially any bit rate may be used, including from 32 to 64 to 96 to 128 kbps on the lower end to 256, 448 or 640 kbps on the higher end. Of course, bit rates below or above the listed bit rates are also used. Lower bit rates are used more with limited functionality mobile devices such as flip phones or wearable devices, while higher bit rates are used with televisions and home theaters. In some embodiments, the distribution system transmits high quality Dolby Digital 5.1 or 7.1 streams, Dolby Atmos streams, lossless audio streams that use, for example, the free lossless audio codec (FLAC), the waveform audio file format (WAV), or other high-end audio streams. These high-bit-rate audio streams are selected based on the bandwidth and device constraints identified above, as well as content characteristics as indicated by metadata associated with the content. As such, the high-bit-rate audio streams are provided alongside high-quality video streams without impacting the video streams.

In some cases, distribution systems provide high-end audio or low-end audio as part of different tiered service plans. For example, a content provider markets high-bit-rate audio streams as a selling point to users that have home theaters or high-quality speakers. Such users are willing to pay more to have higher-quality audio streams. Conversely, users that only watch content on their mobile devices are content with a plan that provides lower-quality audio that consumes less data. When such users are viewing content on their mobile device, they receive an audio stream at a quality level that is acceptable to them while avoiding the high data usage that would come with a higher-tiered plan. Accordingly, in each case, a content provider presents plans that are suited to each user's needs. Users that care about high-definition sound choose a high-bit-rate plan, and users who are content with lower-quality sound select a lower bit-rate plan.

In this manner, a distribution system uses the systems herein to provide improved audio and/or multimedia experiences to its users. For example, the distribution system prioritizes a video stream and select a video encoding bit rate that reflects this priority. Then, with the remaining bandwidth, the distribution system adjusts the audio bit rate based on a variety of different factors, including available bandwidth and device capabilities. The distribution system changes the audio bit rate dynamically throughout a user's audio-video session, from the initial playback to the closing credits. Furthermore, devices that do not support such dynamic adjustments are blacklisted to ensure that each device's playback experience is satisfactory for that device. These and other embodiments are implemented together or separately to provide the features and advantages discussed herein.

EXAMPLE EMBODIMENTS

1. A computer-implemented method for adaptively streaming multimedia content, the method comprising: determining that audio quality is to be adjusted for a multimedia streaming connection over which audio data and video data are being streamed to a content player, the audio data being streamed at a specified audio quality level and the video data being streamed at a specified video quality level; determining that a specified minimum video quality level is to be maintained while adjusting the audio quality level; and dynamically adjusting the audio quality level of the multimedia streaming connection while maintaining the video quality level of the multimedia streaming connection at at least the specified minimum video quality level.

2. The computer-implemented method of claim 1, wherein dynamically adjusting the audio quality level comprises increasing the audio quality level.

3. The computer-implemented method of claim 2, wherein the audio quality level is automatically increased to one or more subsequent higher quality levels until the video quality level reaches a specified quality level that is higher quality than the specified minimum video quality level.

4. The computer-implemented method of claim 1, wherein the audio quality level is adjusted according to a specified bitrate ladder.

5. The computer-implemented method of claim 1, wherein the audio quality level is dynamically adjusted according to one or more user preferences, the user preferences indicating whether audio or video is to be prioritized in the multimedia streaming connection.

6. The computer-implemented method of claim 1, further comprising: determining that the content player is operating on a specified electronic device; identifying one or more audio or video hardware capabilities of the specified electronic device; and dynamically adjusting the audio quality level of the multimedia streaming connection according to the audio or video capabilities of the specified electronic device.

7. The computer-implemented method of claim 6, wherein the audio quality level is dynamically adjusted for a plurality of different types of electronic devices.

8. The computer-implemented method of claim 6, wherein an audio data rate at which the audio data is transmitted over the multimedia streaming connection is varied based on a cache size associated with the specified electronic device.

9. The computer-implemented method of claim 1, wherein dynamically adjusting the audio quality level comprises decreasing the audio quality level.

10. The computer-implemented method of claim 9, wherein the audio quality level is dynamically decreased upon determining that network bandwidth for the multimedia streaming connection has dropped below a specified amount.

11. The computer-implemented method of claim 9, wherein the video data corresponds to a movie or television show and wherein the audio quality level is dynamically decreased upon determining that an audio track associated with the movie or television show is substantially silent for at least a minimum specified period of time.

13. The system of claim 12, wherein the video quality level is prioritized over the audio quality level in the multimedia streaming connection, such that the audio quality level is dynamically reduced to maintain a specified minimum video quality level.

14. The system of claim 12, wherein a bit rate associated with the audio data in the multimedia streaming connection is varied dynamically based on underlying content associated with the audio data.

15. The system of claim 12, further comprising, prior to streaming data through the multimedia streaming connection, determining a startup delay that would be incurred if a higher audio bitrate were to be used to stream the audio data.

16. The system of claim 12, wherein the audio and video data are streamed to the content player according to one or more margin curves.

17. The system of claim 12, wherein the audio quality level is dynamically adjusted for a plurality of audio data streams that are part of the multimedia streaming connection.

18. The system of claim 12, further comprising: analyzing one or more portions of prior transmission data associated with audio and video data transferred during the multimedia streaming connection; predicting a future amount of audio and video data that will be transferred using the multimedia streaming connection; and dynamically adjusting the audio quality level based on the predicted future amount of audio and video data that is to be transferred using the multimedia streaming connection.

19. The system of claim 12, further comprising locking the audio quality level at a specified level for at least a minimum amount of time after the dynamic adjustment.

20. A non-transitory computer-readable medium comprising one or more computer-executable instructions that, when executed by at least one processor of a computing device, cause the computing device to: determine that audio quality is to be adjusted for a multimedia streaming connection over which audio data and video data are being streamed to a content player, the audio data being streamed at a specified audio quality level and the video data being streamed at a specified video quality level; determine that a specified minimum video quality level is to be maintained while adjusting the audio quality level; and dynamically adjust the audio quality level of the multimedia streaming connection while maintaining the video quality level of the multimedia streaming connection at at least the specified minimum video quality level.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein represent portions of a single module or application. In addition, in certain embodiments one or more of these modules represent one or more software applications or programs that, when executed by a computing device, cause the computing device to perform one or more tasks. For example, one or more of the modules described and/or illustrated herein represent modules stored and configured to run on one or more of the computing devices or systems described and/or illustrated herein. One or more of these modules also represent all or portions of one or more special-purpose computers configured to perform one or more tasks.

In addition, one or more of the modules described herein transform data, physical devices, and/or representations of physical devices from one form to another. For example, one or more of the modules recited herein receives data to be transformed, transform the data, output a result of the transformation to monitor video quality, and use the result of the transformation to adjust audio quality while maintaining video quality. Additionally or alternatively, one or more of the modules recited herein transforms a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for adaptively streaming multimedia content, the method comprising:
    determining that audio quality is to be adjusted for a multimedia streaming connection over which audio data and video data are being streamed to a content player over a data transmission network, the audio data being streamed at a specified audio quality level and the video data being streamed at a specified video quality level;
    determining that a specified minimum video quality level is to be maintained while adjusting the audio quality level;
    identifying, while monitoring the video quality level of the video data being streamed, an audio quality level up to which, under current data transmission network conditions, the audio quality is adjustable while maintaining delivery of the specified minimum video quality level; and
    dynamically adjusting the audio quality level of the multimedia streaming connection up to the identified audio quality level that allows the video quality level of the multimedia streaming connection to continue streaming at at least the specified minimum video quality level.

2. The computer-implemented method of claim 1, wherein dynamically adjusting the audio quality level comprises increasing the audio quality level.

3. The computer-implemented method of claim 2, wherein the audio quality level is automatically increased to one or more subsequent higher quality levels until the video quality level reaches a specified quality level that is higher quality than the specified minimum video quality level.

4. The computer-implemented method of claim 1, wherein the audio quality level is adjusted according to a specified bitrate ladder.

5. The computer-implemented method of claim 1, wherein the audio quality level is dynamically adjusted according to one or more user preferences, the user preferences indicating whether audio or video is to be prioritized in the multimedia streaming connection.

6. The computer-implemented method of claim 1, further comprising:
   determining that the content player is operating on a specified electronic device;
   identifying one or more audio or video hardware capabilities of the specified electronic device; and
   dynamically adjusting the audio quality level of the multimedia streaming connection according to the audio or video capabilities of the specified electronic device.

7. The computer-implemented method of claim 6, wherein the audio quality level is dynamically adjusted for a plurality of different types of electronic devices.

8. The computer-implemented method of claim 6, wherein an audio data rate at which the audio data is transmitted over the multimedia streaming connection is varied based on a cache size associated with the specified electronic device.

9. The computer-implemented method of claim 1, wherein dynamically adjusting the audio quality level comprises decreasing the audio quality level.

10. The computer-implemented method of claim 9, wherein the audio quality level is dynamically decreased upon determining that network bandwidth for the multimedia streaming connection has dropped below a specified amount.

11. The computer-implemented method of claim 9, wherein the video data corresponds to a movie or television show and wherein the audio quality level is dynamically decreased upon determining that an audio track associated with the movie or television show is substantially silent for at least a minimum specified period of time.

12. A system comprising:
   at least one physical processor;
   physical memory comprising computer-executable instructions that, when executed by the physical processor, cause the physical processor to:
      determine that audio quality is to be adjusted for a multimedia streaming connection over which audio data and video data are being streamed to a content player over a data transmission network, the audio data being streamed at a specified audio quality level and the video data being streamed at a specified video quality level;
      determine that a specified minimum video quality level is to be maintained while adjusting the audio quality level;
      identify, while monitoring the video quality level of the video data being streamed, an audio quality level up to which, under current data transmission network conditions, the audio quality is adjustable while maintaining delivery of the specified minimum video quality level; and
      dynamically adjust the audio quality level of the multimedia streaming connection up to the identified audio quality level that allows the video quality level of the multimedia streaming connection to continue streaming at at least the specified minimum video quality level.

13. The system of claim 12, wherein the video quality level is prioritized over the audio quality level in the multimedia streaming connection, such that the audio quality level is dynamically reduced to maintain a specified minimum video quality level.

14. The system of claim 12, wherein a bit rate associated with the audio data in the multimedia streaming connection is varied dynamically based on underlying content associated with the audio data.

15. The system of claim 12, further comprising, prior to streaming data through the multimedia streaming connection, determining a startup delay that would be incurred if a higher audio bitrate were to be used to stream the audio data.

16. The system of claim 12, wherein the audio and video data are streamed to the content player according to one or more margin curves.

17. The system of claim 12, wherein the audio quality level is dynamically adjusted for a plurality of audio data streams that are part of the multimedia streaming connection.

18. The system of claim 12, further comprising:
   analyzing one or more portions of prior transmission data associated with audio and video data transferred during the multimedia streaming connection;
   predicting a future amount of audio and video data that will be transferred using the multimedia streaming connection; and
   dynamically adjusting the audio quality level based on the predicted future amount of audio and video data that is to be transferred using the multimedia streaming connection.

19. The system of claim 12, further comprising locking the audio quality level at a specified level for at least a minimum amount of time after the dynamic adjustment.

20. A non-transitory computer-readable medium comprising one or more computer-executable instructions that, when executed by at least one processor of a computing device, cause the computing device to:
   determine that audio quality is to be adjusted for a multimedia streaming connection over which audio data and video data are being streamed to a content player over a data transmission network, the audio data being streamed at a specified audio quality level and the video data being streamed at a specified video quality level;
   determine that a specified minimum video quality level is to be maintained while adjusting the audio quality level;
   identify, while monitoring the video quality level of the video data being streamed, an audio quality level up to which, under current data transmission network conditions, the audio quality is adjustable while maintaining delivery of the specified minimum video quality level; and
   dynamically adjust the audio quality level of the multimedia streaming connection up to the identified audio quality level that allows the video quality level of the multimedia streaming connection to continue streaming at at least the specified minimum video quality level.

* * * * *